A. S. Macomber,
Wheelwrights' Machine.
Nº 15,079. Patented June 10, 1856.
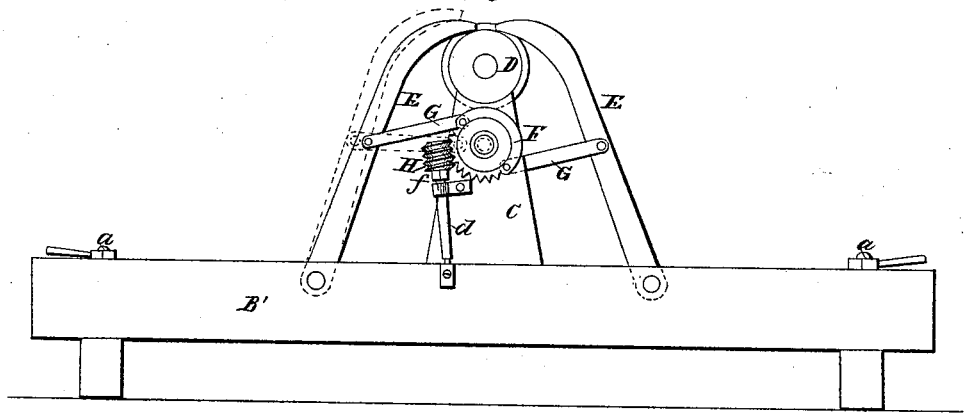
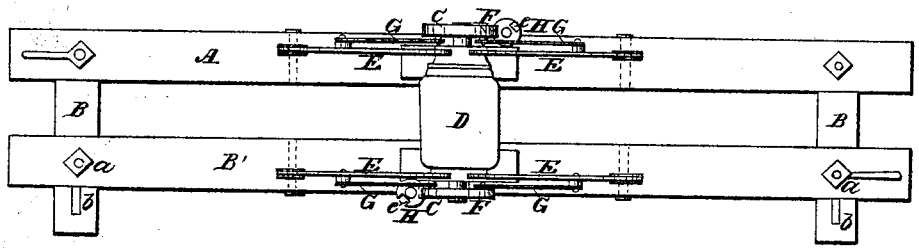

UNITED STATES PATENT OFFICE.

A. S. MACOMBER, OF BENNINGTON, VERMONT.

WHEELWRIGHT'S MACHINERY.

Specification of Letters Patent No. 15,079, dated June 10, 1856.

*To all whom it may concern:*

Be it known that I, A. S. MACOMBER, of Bennington, in the county of Bennington and State of Vermont, have invented a new and useful Device for Holding Hubs while being Mortised or Having Spokes Driven in Them; and I do hereby declare that the following is a full, clear, and exact description of the same, reference being had to the annexed drawings, making a part of this specification, in which—

Figure 1, is a side view of my improvement. Fig. 2, is a plan or top view of the same.

Similar letters of reference indicate corresponding parts in the two figures.

My invention consists in holding or clamping the hub upon a suitable bed by means of jaws attached by pivots to bars, one of which is adjustable; the jaws being operated by means of worm wheels and screws, and connecting rods; arranged as will be presently shown and described.

To enable those skilled in the art to fully understand and construct my invention, I will proceed to describe it.

A, represents a bar of any suitable size, the ends of which are permanently attached by bolts to cross-pieces B, B.

B', represents a bar similar to the bar A, and placed parallel with it. The bar B', is attached to the cross pieces B, B, by bolts (*a*), which pass through slots (*b*), in the cross pieces B, and allow the bar B', to be adjusted nearer to, or farther from, the bar A.

To the center of each bar A, B, there is permanently attached an upright, C. The upper ends of these uprights are of concave form, in order to receive the ends of the hub D, to be mortised or otherwise acted upon. To each bar A, B, there are attached two jaws E, E; the lower ends of the jaws being pivoted in the bars A, B, one at each side of the uprights C. The upper parts of the jaws ore of curved form, and bear upon the ends of the hub D, as plainly shown in Fig. 1.

To the outer side of each upright C, there is attached a worm wheel F, toothed about half way around, and to each wheel F, there is attached by pivots (*c*), two connecting rods G, G; the connecting rods being at opposite sides of the centers or axes of the wheels F. The outer ends of the connecting rods G, G, are pivoted to the jaws E, E, at about their centers.

H, H, represent screws placed upon shafts (*d*), the lower ends of which are stepped on the bars A, B. The screws H, gear into the wheels F, and have each a smooth segment or portion, (*e*), cut off, forming a sort of groove longitudinally in each screw.

The operation is as follows: The ends of the hub D, are placed upon the uprights C, C, the bar B', being adjusted so that the uprights C, C, may be the proper distance apart corresponding to the length of the hub. The upper ends of the jaws E, are then pressed firmly down upon the ends of the hub by turning the screw H, by means of a wrench which may be fitted on a square (*f*), at the lower part of each screw, the screws turning the wheels H, which by means of the connecting rods G, actuate the jaws E.

When the hub is to be removed from the bed or turned upon it the screws H, are turned till their grooves or smooth portions (*e*), are brought opposite the wheels F, and the jaws may then be forced directly back by hand.

The above invention is simple and by its use the hubs may be easily secured and firmly held while being mortised, and while having spokes driven in its mortises; the hub may also be turned or adjusted on the uprights with facility, as the work progresses.

Having thus described my invention, what I claim as new and desire to secure by Letters Patent, is—

The jaws E, operated by the screws H, worm wheels F, and connecting rods G; one pair of jaws being attached to an adjustable bar B'; the above parts being arranged, as shown, for the purpose specified.

A. S. MACOMBER.

Witnesses:
JOHN SIBLEY,
JONATHAN BOYER.